United States Patent
Amanullah

(10) Patent No.: US 10,934,465 B2
(45) Date of Patent: *Mar. 2, 2021

(54) DATE SEED-BASED MULTI-MODAL PARTICULATE ADMIXTURE FOR MODERATE TO SEVERE LOSS CONTROL

(71) Applicant: Saudi Arabian Oil Company, Dhahran (SA)

(72) Inventor: Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 95 days.

This patent is subject to a terminal disclaimer.

(21) Appl. No.: 16/279,279

(22) Filed: Feb. 19, 2019

(65) Prior Publication Data

US 2019/0177593 A1 Jun. 13, 2019

Related U.S. Application Data

(63) Continuation of application No. 15/436,134, filed on Feb. 17, 2017, now Pat. No. 10,259,982.

(60) Provisional application No. 62/361,293, filed on Jul. 12, 2016.

(51) Int. Cl.
  C09K 8/035 (2006.01)
  C09K 8/506 (2006.01)
  C09K 8/516 (2006.01)

(52) U.S. Cl.
  CPC ............ *C09K 8/035* (2013.01); *C09K 8/506* (2013.01); *C09K 8/516* (2013.01); *C09K 2208/04* (2013.01)

(58) Field of Classification Search
  CPC .... C09K 2208/04; C09K 8/035; C09K 8/506; C09K 8/516
  See application file for complete search history.

(56) References Cited

U.S. PATENT DOCUMENTS

| | | |
|---|---|---|
| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,217,801 A | 11/1965 | Fast et al. |
| 4,110,225 A | 8/1978 | Cagle |
| 4,247,403 A | 1/1981 | Foley et al. |
| 4,275,788 A | 6/1981 | Sweatman |
| 4,428,844 A | 1/1984 | Wagener |
| 4,474,665 A | 10/1984 | Green |
| 4,579,668 A | 4/1986 | Messenger |
| 4,619,772 A | 10/1986 | Black et al. |
| 4,957,166 A | 9/1990 | Sydansk |
| 5,004,553 A | 4/1991 | House et al. |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,861,392 B2 | 3/2005 | Shaarpour |
| 6,932,158 B2 | 8/2005 | Burts |
| 7,226,895 B2 | 6/2007 | Xiang |

(Continued)

FOREIGN PATENT DOCUMENTS

| | | |
|---|---|---|
| CN | 101311243 A | 11/2008 |
| CN | 101724383 A | 6/2010 |

(Continued)

OTHER PUBLICATIONS

"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

(Continued)

*Primary Examiner* — Frances Tischler
(74) *Attorney, Agent, or Firm* — Bracewell LLP; Constance G. Rhebergen; Brian H. Tompkins

(57) ABSTRACT

A date palm seed lost circulation material (LCM) is provided having a date palm seed admixture of date palm seed particles of various sizes. The date palm seed particles may have a size greater than about 2380 microns in a range of about 40% to about 42% by weight, particles having a size greater than about 595 microns and less than about 2381 microns in a range of about 46% to about 48% by weight, particles having a size greater than about 400 microns and less than about 596 microns in a range of about 4% to about 6% by weight, particles having a size less than about 210 microns in a range of about 4% to about 6% by weight, and particles having a size less than about 149 microns in a range of about 1% to about 3% by weight. Methods of lost circulation control using and manufacture of a date palm seed LCM are also provided.

7 Claims, 1 Drawing Sheet

(56) References Cited

U.S. PATENT DOCUMENTS

| | | |
|---|---|---|
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,795,184 B2 | 9/2010 | Pomerleau |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,290,687 B1 | 3/2016 | Weaver |
| 9,410,066 B2 | 8/2016 | Ghassemzadeh |
| 9,416,306 B2 | 8/2016 | Savari et al. |
| 9,453,156 B2 | 9/2016 | Wu |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 9,957,433 B2 | 5/2018 | Amanullah et al. |
| 10,513,647 B2 | 12/2019 | Amanullah |
| 10,519,357 B2 | 12/2019 | Amanullah |
| 2002/0010100 A1 | 1/2002 | Wood |
| 2004/0023813 A1 | 2/2004 | Burts, III |
| 2004/0129460 A1 | 7/2004 | MacQuoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2013/0206479 A1 | 8/2013 | Smith |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0008044 A1 | 1/2015 | Fontenot |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2016/0060985 A1 | 3/2016 | Lin et al. |
| 2016/0096988 A1 | 4/2016 | Lin et al. |
| 2016/0137903 A1 | 5/2016 | Friedheim et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0289528 A1 | 10/2016 | Wagle et al. |
| 2016/0312100 A1 | 10/2016 | Amanullah et al. |
| 2017/0058180 A1 | 3/2017 | Hossain et al. |
| 2017/0137688 A1 | 5/2017 | Amanullah |
| 2017/0166795 A1 | 6/2017 | Walker et al. |
| 2017/0240791 A1 | 8/2017 | Oliveira et al. |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |
| 2018/0201819 A1 | 7/2018 | Amanullah |
| 2019/0177594 A1 | 6/2019 | Amanullah |
| 2019/0177595 A1 | 6/2019 | Amanullah |
| 2019/0233705 A1 | 8/2019 | Amanullah et al. |
| 2019/0270924 A1 | 9/2019 | Amanullah |
| 2020/0079987 A1 | 3/2020 | Amanullah |
| 2020/0079988 A1 | 3/2020 | Amanullah |

FOREIGN PATENT DOCUMENTS

| | | |
|---|---|---|
| CN | 102127403 A | 7/2011 |
| CN | 203035080 U | 7/2013 |
| CN | 103740346 A | 4/2014 |
| CN | 104087274 A | 10/2014 |
| CN | 104419392 A | 3/2015 |
| GB | 2506603 A | 4/2014 |
| GB | 2518441 A | 3/2015 |
| JP | 0671171 A | 3/1994 |
| WO | 200153429 A1 | 7/2001 |
| WO | 2004013448 A2 | 2/2004 |
| WO | 2010019535 A2 | 2/2010 |
| WO | 2010088484 A2 | 8/2010 |
| WO | 2010142370 A1 | 12/2010 |
| WO | 2012037600 A1 | 3/2012 |
| WO | 2012061187 A2 | 5/2012 |
| WO | 2013039938 A1 | 3/2013 |
| WO | 2014008598 A1 | 1/2014 |
| WO | 2014197417 A1 | 12/2014 |
| WO | 2015142156 A1 | 9/2015 |
| WO | 2015199652 A1 | 12/2015 |
| WO | 2016019416 A1 | 2/2016 |
| WO | 2016028470 A1 | 2/2016 |
| WO | 2016172287 A1 | 10/2016 |
| WO | 2017087434 A1 | 5/2017 |
| WO | 2018005575 A1 | 1/2018 |
| WO | 2018013619 A1 | 1/2018 |

OTHER PUBLICATIONS

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug—A date seed-based sized particulate LCM." SPE Kingdom of Saudi Arabia Annual Technical Symposium and Exhibition. Society of Petroleum Engineers, 2016; pp. 1-9.

BakerHughes.com "SOLUFLAKE Flaked Calcium Carbonate" (XP055401101) Jan. 8, 2016; p. 1.

International Search Report and Written Opinion for International Application No. PCT/US2016/062130; Report dated Jan. 27, 2017; pp. 1-12.

International Search Report and Written Opinion for International Application No. PCT/US2017/027287; report dated Sep. 13, 2017; 11 pages.

International Search Report and Written Opinion for International Application No. PCT/US2017/039614; Report dated Sep. 11, 2017; pp. 1-12.

(56) References Cited

OTHER PUBLICATIONS

International Search Report and Written Opinion for International Application No. PCT/US2017/039616; Report dated Sep. 11, 2017; pp. 1-11.
International Search Report and Written Opinion for International Application No. PCT/US2017/047877; Report dated Oct. 27, 2017; pp. 1-15.
International Search Report and Written Opinion for International Application No. PCT/US2017/053355; International filing date Sep. 26, 2017; Report dated Jan. 17, 2018; pp. 1-14.
International Search Report and Written Opinion for International Application No. PCT/US2017/060079; International Filing Date Nov. 6, 2017; Report dated Dec. 18, 2017; pp. 1-14.
International Search Report and Written Opinion for International Application No. PCT/US2017/067179 International Filing Date Dec. 19, 2017; Report dated Feb. 21, 2018; pp. 1-14.
International Search Report and Written Opinion for International Application No. PCT/US2017/041611; International Filing Date Jul. 12, 2017; Report dated Oct. 27, 2017 (pp. 1-15).
International Search Report and Written Opinion for International Application No. PCT/US2018/034291; International Filing Date May 24, 2018; Report dated Jul. 31, 2018 (pp. 1-11).
International Search Report and Written Opinion for International Application No. PCT/US2018/048423; International Filing Date Aug. 29, 2018; Report dated Nov. 29, 2018 (pp. 1-12).
Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.
Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.
Wajheeuddin, Mohammed; "Development of an Environmentally-Friendly Drilling Fluid Using Date Seeds and Grass" Masters thesis, King Fahd University of Petroleum & Minerals, 2014; pp. 1-138.

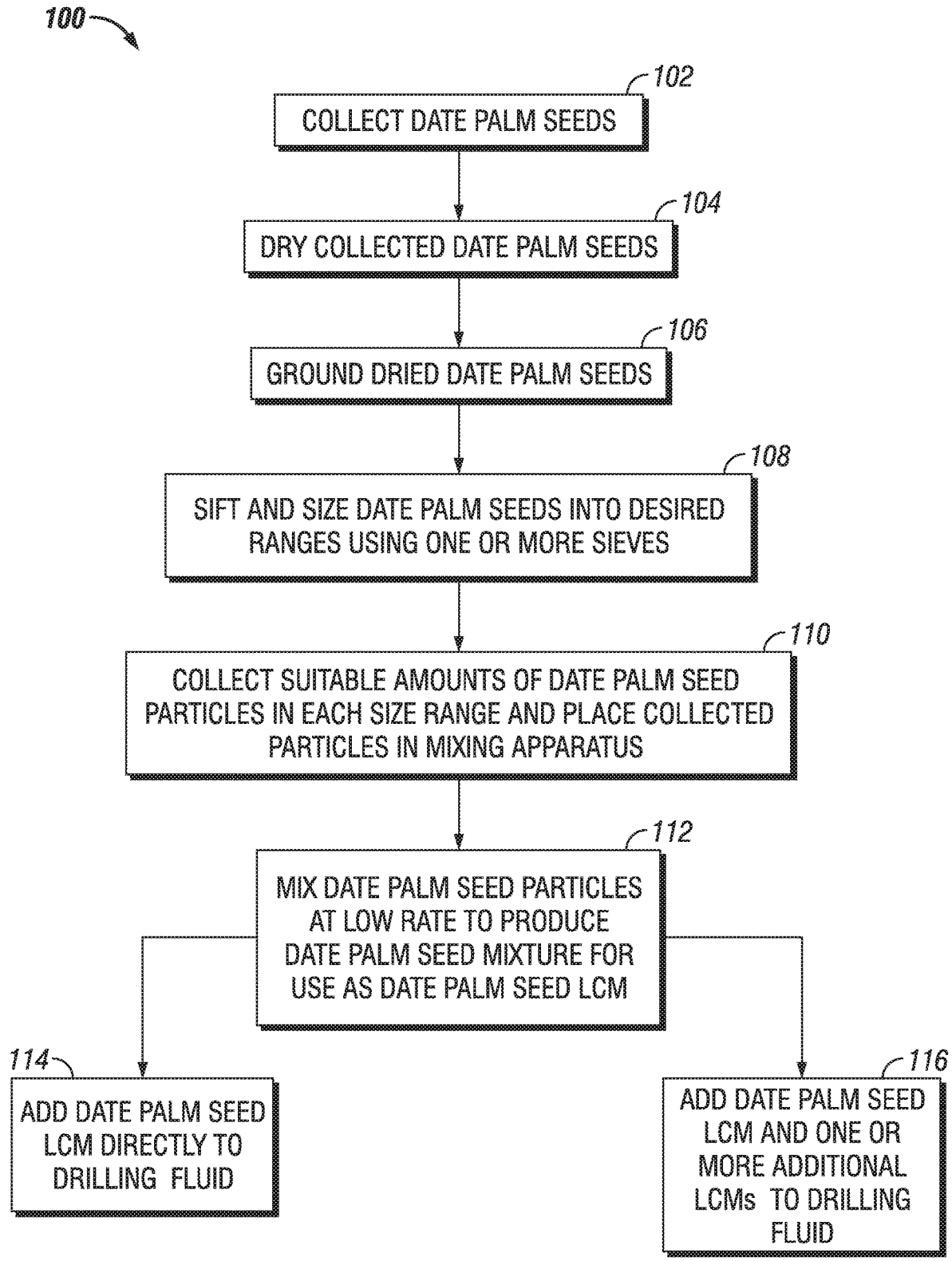

DATE SEED-BASED MULTI-MODAL PARTICULATE ADMIXTURE FOR MODERATE TO SEVERE LOSS CONTROL

CROSS-REFERENCE TO RELATED APPLICATIONS

This application is a continuation of and claims priority from U.S. Non-provisional application Ser. No. 15/436,134 filed Feb. 17, 2017 and titled "DATE SEED-BASED MULTI-MODAL PARTICULATE ADMIXTURE FOR MODERATE TO SEVERE LOSS CONTROL," which claims priority from U.S. Provisional Application No. 62/361,293 filed Jul. 12, 2016, and titled "DATE SEED-BASED MULTI-MODAL PARTICULATE ADMIXTURE FOR MODERATE TO SEVERE LOSS CONTROL," each of which are incorporated by reference in their entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation, which can be encountered during any stage of operations, occurs when drilling fluid (or drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost d as seepage type, moderate type, severe type, and total loss. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling.

SUMMARY

Lost circulation materials (LCMs) are used to mitigate the lost circulation by blocking the path of the drilling mud into the formation. The type of LCM used in a loss circulation situation depends on the extent of lost circulation and the type of formation. For example, granular-type LCMs may be used to control lost circulation and strengthen the near wellbore formation to widen the mud weight window. Such granular-type LCMs may be formed from limestone, marbles, wood, nuts, Formica® corn cobs, and cotton hulls. Losses of drilling fluids, losses of production, and the costs of LCMs, including importation of LCMs to drilling locations, may result in lost expenses in drilling operations. Additionally, lost circulation can cause environmental problems if drilling fluids or LCMs interact with the environment surrounding the reservoir. The manufacture, use, and disposal of some conventional LCMs may pose a risk to sensitive environments, such as marine environments because they are not biodegradable and can be toxic to marine life. Additionally, the purchase and importation of LCMs to drilling locations may be expensive and time-consuming.

In some embodiments, a method to control lost circulation in a lost circulation zone in a wellbore is provided. The method includes introducing an altered drilling fluid into the well bore such that the altered drilling fluid contacts the lost circulation zone and reduces a rate of lost circulation into the lost circulation zone. The altered drilling fluid includes a drilling fluid and a lost circulation material (LCM). The LCM includes a first plurality of untreated particles having a first particle size and a second plurality of the untreated particles having a second particle size. The untreated particles include ground date palm seeds. In some embodiments, the method includes adding the LCM to the drilling fluid to create the altered drilling fluid. In some embodiments, the untreated particles consist of ground date palm seeds. In some embodiments, the altered drilling fluid consists of the drilling fluid and the LCM. In some embodiments, the first particle size is greater than 400 microns and the second particle size is less than 210 microns. In some embodiments, the LCM includes a third plurality of the untreated particles having a third particle size, a fourth plurality of the untreated particles having a fourth particle size, and a fifth plurality of the untreated particles having a fifth particle size. In some embodiments, the first particle size is greater than 2380 microns. In some embodiments, the second particle size is greater than 595 microns and less than 2381 microns. In some embodiments, the third particle size is greater than 400 microns and less than 596 microns. In some embodiments, the fourth particle size is less than 210 microns and greater than 148 microns. In some embodiments, the fifth particle size is less than 149 microns. In some embodiments, the LCM consists of the first plurality of untreated particles having a first particle size, the second plurality of the untreated particles having a second particle size, the third plurality of the untreated particles having a third particle size, the fourth plurality of the untreated particles having a fourth particle size, and the fifth plurality of the untreated particles having a fifth particle size. In some embodiments, the reduced rate of lost circulation is less than an LCM formed from tree nuts and, in some embodiments, the LCM formed from tree nuts comprises an LCM formed from walnuts.

In some embodiments, a method of forming an altered drilling fluid is provided. The method includes drying a plurality of date palm seeds and grinding the plurality of date palm seeds to produce a plurality of untreated particles. The method also includes sifting the untreated particles into at least two groups of the untreated particles. The at least two groups include a first group of the untreated particles having a first particle size, and a second group of the untreated particles having a second particle size. The method also includes mixing the first group and the second group into a lost circulation material (LCM) composition. In some embodiments, the method includes blending the LCM composition into a drilling fluid to create an altered drilling fluid. In some embodiments, the drilling fluid is a water-based drilling fluid. In some embodiments, the LCM composition consists essentially of the plurality of untreated particles. In some embodiments, the plurality of untreated particles are not introduced to an alkali, an acid, a bleaching or an oxidation agent before mixing into the LCM composition. In some embodiments, drying the plurality of date palm seeds includes drying in the sun over a time period in atmospheric conditions. In some embodiments, the first particle size is greater than 400 microns and the second particle size is less than 210 microns. In some embodiments, the at least two groups include a third group of the untreated particles having a third particle size, a fourth group of the untreated particles having a fourth particle size, and a fifth group of the untreated particles having a fifth particle size. In some embodiments, the first particle size is greater than 2380 microns. In some embodiments, the second particle size is greater than 595 microns and less than 2381 microns. In some embodiments, the third particle size is greater than 400 microns and less than 596 microns. In some embodiments, the fourth particle size is less than 210 microns and greater than 148 microns. In some embodiments, the fifth particle size is less than 149 microns. In some embodiments, the at least two groups consist of the first group of untreated particles having a first particle size, the second group of the untreated particles having a second particle size, the third group of the untreated particles having a third particle size, the fourth group of the untreated particles having a fourth particle size, and the fifth group of the untreated particles having a fifth particle size.

In some embodiments, an altered drilling fluid is provided. The altered drilling fluid includes a drilling fluid and a lost circulation material (LCM). The LCM includes a first plurality of untreated particles having a first particle size and a second plurality of the untreated particles having a second particle size. The untreated particles include ground date palm seeds. In some embodiments, the untreated particles consist of ground date palm seeds. In some embodiments, the first particle size is greater than 2380 microns and the second particle size is less than 210 microns. In some embodiments, the LCM includes a third plurality of the untreated particles having a third particle size, a fourth plurality of the untreated particles having a fourth particle size, and a fifth plurality of the untreated particles having a fifth particle size. In some embodiments, the first particle size is greater than 2380 microns. In some embodiments, the second particle size is greater than 595 microns and less than 2381 microns. In some embodiments, the third particle size is greater than 400 microns and less than 596 microns. In some embodiments, the fourth particle size is less than 210 microns and greater than 148 microns. In some embodiments, the fifth particle size is less than 149 microns. In some embodiments, the LCM consists of the first plurality of untreated particles having a first particle size, the second plurality of the untreated particles having a second particle size, the third plurality of the untreated particles having a third particle size, the fourth plurality of the untreated particles having a fourth particle size, and the fifth plurality of the untreated particles having a fifth particle size

BRIEF DESCRIPTION OF THE DRAWINGS

FIG. 1 is a flowchart of a process for manufacturing and using a date palm seed LCM in accordance with an example embodiment of the disclosure.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments set forth in the disclosure. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date palm seed LCM that includes date palm seed (also referred to as "date tree seed") particles to mitigate or prevent such lost circulation in a well, as well as provide seepage control and minimize or prevent fluid loss. The date palm seed LCM includes a date palm seed particle admixture having at least two sizes of date palm seed particles. In some embodiments, the date palm seed admixture includes particles having a size greater than about 2380 microns in a range of about 40% to about 42% by weight of the total weight of the admixture (w/w %), particles having a size greater than about 595 microns and less than about 2380 microns in a range of about 46% to about 48% by weight of the total weight, particles having a size greater than about 400 microns and less than about 595 microns in a range of about 4% to about 6% by weight of the total weight, particles having a size less than about 210 microns and greater than about 148 microns in a range of about 4% to about 6% by weight of the total weight, and particles having a size less than about 149 microns in a range of about 1% to about 3% by weight of the total weight of the admixture.

In some embodiments, the date palm seed LCM may be added directly to a drilling fluid (for example, a drilling mud) as a preventative approach for loss circulation control. In some embodiments, the date palm seed LCM may be mixed with a carrier fluid and a viscosifier to form a homogenous suspension or a pill. In some embodiments, the date palm seed LCM may be combined with another LCM and mixed in a carrier fluid and a viscosifier to form a homogenous suspension or a pill. In some embodiments, the date palm seed LCM may be added as a component of a loss control slurry (LCS). In some embodiments, the date palm seed LCM may be combined with other LCMs to form an LCM blend for different loss control applications. Additionally, the LCM may also be added to a drilling fluid system to increase the fracture gradient due to an increase in load bearing capacity or hoop stress around the wellbore.

In some embodiments, the date palm seed LCM may include untreated date palm seed particles. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the LCM. In accordance with this definition, an LCM that is treated may behave in a manner different than its original starting material. In such embodiments, the date palm seed particles may be manufactured without treating before, during, or after crushing, grinding, drying, or any other processing.

The date palm seed LCM described in the disclosure is chemically inert, physically granular, mechanically strong, biodegradable, environmentally-friendly and non-toxic. As described infra, the date palm seed LCM may have a plugging efficiency comparable to or better than conventional tree nut based LCMs such as a walnut LCM and thus may have sealing and blocking capacity better than conventional tree nut based LCMs.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a date palm seed LCM were prepared and evaluated against a walnut LCM. A date palm seed LCM having a date palm seed admixture of various sizes of date palm seed particles was prepared according to the techniques described in the disclosure. The composition of the example date palm seed LCM is shown in Table 1, with the amount of each sized particles expressed in a range of weight percentage of the total weight (w/w %) and an average weight percentage of the total weight. Table 1 also includes the mesh number of the sieves used in preparing the date palm seed LCM:

TABLE 1

Date Palm Seed Admixture Composition

| Range of w/w % | Average w/w % | Sieve Mesh No. | Minimum date palm seed particle size |
|---|---|---|---|
| 40-42% Retained | 41% Retained | 8 | 2380 |
| 46-48% Retained | 47% Retained | 30 | 595 |
| 4-6% Retained | 5% Retained | 40 | 400 |
| 4-6% Passed | 5% Passed | 70 | 210 |
| 1-3% Passed | 2% Passed | 100 | 149 |

Plugging efficiency tests were conducted on the date palm seed LCM and walnut LCM using a 2 mm slotted disc and a Permeability Plugging Tester (also referred to as "PPT" or "Pore Plugging Test" apparatus) manufactured by OFI Testing Equipment, Inc., of Houston, Tex., USA. The conventional cell of the Permeability Plugging Tester used in the plugging efficiency test may be operated up to 2,000 psi and 500° F. The 2 mm slotted metal disc was used as the filter medium of the Permeability Plugging Tester apparatus in the plugging efficiency test. The plugging efficiency test was performed at conditions of about 250° F. and about 1500 psi differential pressure. Four plugging efficiency tests were performed using four different muds.

The date palm seed LCM and walnut LCM were tested using the Permeability Plugging Tester apparatus and the following plugging efficiency test procedure for each plugging efficiency test:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Pour a test sample of a homogenous mixture of tested mud and the LCM into the test cell;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;
14. Place the cell into the heating jacket of the Permeability Plugging Tester apparatus;
15. Connect a pressure hose from the hydraulic hand pump to the bottom of the test cell via a quick connector and ensure the bottom stem is closed;
16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.
17. Place a thermometer into the hole at the top of the test cell. wait until the testing temperature is reached, and monitor the cell pressure while heating and bleed off pressure if necessary by opening the pressure relived valve on the side of the hydraulic hand pump;
18. Once the test sample has reached the testing temperature, pump the hydraulic hand pump until the pump gauge shows the testing pressure plus the required back pressure;
19. Apply the required back pressure to the top of the cell, open the top valve, and pump the hydraulic hand pump to reestablish the testing pressure;
20. To determine the spurt volume, collect the fluid from the back pressure collector in a measuring cylinder and record the amount, ensuring that all the fluid has been expelled;
21. Collect the fluid periodically over a 30 minute time period and check the back pressure gauge to ensure that the testing pressure remains less than the pressure threshold (about 3000 psi) of the built-in safety disc of the Permeability Plugging Tester apparatus and avoid expulsion of hot hydraulic oil;
22. Record the spurt loss, total leak off, and PPT values over the 30 minute time period and record the cake thickness after dismantling the test cell.

For the first plugging efficiency test, the date palm seed LCM and walnut LCM were incorporated into a 65 pounds per cubic foot (pcf) bentonite mud. The composition of the 65 pcf bentonite mud with mud components expressed in pounds-per-barrels (lb/bbl or ppb) is shown in Table 2:

TABLE 2

Composition of 65 pcf bentonite mud

| Mud Component | Lb/bbl |
|---|---|
| Water | 340.67 |
| Bentonite | 25.00 |
| Caustic Soda | 0.25 |
| Soda Ash | 0.25 |

Table 3 shows the results of the plugging efficiency tests for the date palm seed LCM at 10 pounds-per-barrel (ppb) and 30 ppb concentrations in the 65 pcf bentonite mud and the plugging efficiency tests for the walnut LCM at 10 ppb and 30 ppb concentrations in the 65 pcf bentonite mud, with the spurt loss, fluid loss, total leak off, and PPT value measured in cubic centimeters (cc) and the cake thickness measured in millimeters (mm):

TABLE 3

Plugging Efficiency Test Results for Date Palm Seed LCM and Walnut LCM in 65 pcf bentonite mud

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 65 pcf bentonite mud | Date palm seed LCM | 10 ppb | 0 | 0.2 | 0.2 | N/A | 0.4 |
| 65 pcf bentonite mud | Walnut LCM | 10 ppb | 1.2 | 133 | 134.2 | N/A | 268.4 |
| 65 pcf bentonite mud | Date palm seed LCM | 30 ppb | 0 | 0 | 0 | N/A | 0 |
| 65 pcf bentonite mud | Walnut LCM | 30 ppb | 0 | 0 | 0 | N/A | 0 |

As shown supra, the 10 ppb concentration of the date palm seed LCM stopped the loss of the whole bentonite mud but allowed some losses of the fluid phase from the mud. The 30 ppb concentration of the date palm seed LCM stopped the loss of the whole bentonite mud and the loss of the fluid phase from the mud. Accordingly, both the 10 ppb and 30 ppb concentrations of the date palm seed LCM showed effective sealing and blocking efficiency. In contrast, the walnut LCM at 10 ppb showed poor plugging efficiency (that is, loss of whole mud and fluid phase from the mud), as shown by the significant spurt loss and fluid loss.

A second plugging efficiency test was conducted on the date palm seed LCM and walnut LCM using a 2 mm slotted disc and the Permeability Plugging Tester apparatus at about 250° F. and about 1500 psi differential pressure. For the second plugging efficiency test, the date palm seed LCM and walnut LCM were incorporated into a 73 pcf KCl-polymer mud. The 73 pcf KCl-polymer mud includes PAC LV filtrate control additive manufactured by BRI-CHEM Supply Corporation of Denver, Colo., USA. The composition of the 73 pcf KCl-polymer mud is shown in Table 4:

TABLE 4

Composition of 73 pcf KCl-polymer mud

| Mud Component | Quantity |
|---|---|
| Water | 310.28 cc |
| Caustic Soda | 0.25 grams (g) |
| Soda Ash | 0.25 g |
| Bentonite | 5.00 g |
| PAC LV | 3.00 g |
| XC Polymer | 1.00 g |
| KCl | 42.31 g |
| $CaCO_3$ | 46.80 g |

Table 5 shows the results of the plugging efficiency tests for the date palm seed LCM at 10 ppb and 30 ppb concentrations in the 73 pcf KCl-polymer mud and the plugging efficiency tests for the walnut LCM at 10 ppb and 30 ppb concentrations in the 73 pcf KCl-polymer mud:

TABLE 5

Plugging Efficiency Test Results for Date Palm Seed LCM and Walnut LCM in 73 pcf KCl-polymer mud

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 73 pcf KCl-polymer mud | Date palm seed LCM | 10 ppb | 0 | 0.2 | 0.2 | N/A | 0.4 |
| 73 pcf KCl-polymer mud | Walnut LCM | 10 ppb | 6.8 | 92 | 98.8 | N/A | 197.6 |
| 73 pcf KCl-polymer mud | Date palm seed LCM | 30 ppb | 0 | 0 | 0 | N/A | 0 |
| 73 pcf KCl-polymer mud | Walnut LCM | 30 ppb | 0 | 0 | 0 | N/A | 0 |

As shown in Table 5, the 10 ppb concentration of the date palm seed LCM stopped the loss of the whole KCl-polymer mud but allowed some losses of the fluid phase from the mud, and. the 30 ppb concentration of the date palm seed LCM stopped the loss of the whole KCl-polymer mud and the loss of the fluid phase from the mud. Both the 10 ppb and 30 ppb concentrations of the date palm seed LCM showed effective sealing and blocking efficiency in the tested mud. In contrast, the walnut LCM at 10 ppb again showed poor plugging efficiency (that is, loss of whole mud and fluid phase from the mud), as shown by the significant spurt loss and fluid loss.

A third plugging efficiency test was conducted on the date palm seed LCM and walnut LCM using a 2 mm slotted disc and the Permeability Plugging Tester apparatus at about 250° F. and about 1500 psi differential pressure. For the third plugging efficiency test, the date palm seed LCM and walnut LCM were incorporated into an 80 pcf NaCl-polymer mud. The 80 pcf NaCl-polymer mud includes PAC LV filtrate control additive manufactured by BRI-CHEM Supply Corporation of Denver, Colo., USA. The composition of the 80 pcf NaCl-polymer mud is shown in Table 6:

TABLE 6

Composition of 80 pcf NaCl-polymer mud

| Mud Component | Quantity |
|---|---|
| Water | 304.64 cc |
| Caustic Soda | 0.25 g |
| Soda Ash | 0.25 g |
| Bentonite | 5.00 g |
| PAC LV | 4.00 g |
| XC Polymer | 1.00 g |
| NaCl | 76.16 g |
| Barite | 57.90 g |

Table 7 shows the results of the plugging efficiency tests for the date palm seed LCM at 10 ppb and 30 ppb concentrations in the 80 pcf NaCl-polymer mud and the plugging efficiency tests for the walnut LCM at 10 ppb and 30 ppb concentrations in the 80 pcf NaCl-polymer mud:

TABLE 7

Plugging Efficiency Test Results for Date Palm Seed LCM and Walnut LCM in 80 pcf NaCl-polymer mud

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 80 pcf NaCl-polymer mud | Date palm seed LCM | 10 ppb | 0 | 0.2 | 0.2 | N/A | 0.4 |
| 80 pcf NaCl-polymer mud | Walnut LCM | 10 ppb | 0 | 0 | 0 | N/A | 0 |
| 80 pcf NaCl-polymer mud | Date palm seed LCM | 30 ppb | 0 | 0 | 0 | N/A | 0 |
| 80 pcf NaCl-polymer mud | Walnut LCM | 30 ppb | 0 | 0 | 0 | N/A | 0 |

As shown in Table 7, both the 10 ppb and 30 ppb concentrations of the date palm seed LCM stopped the loss of the whole NaCl-polymer mud and the loss of the fluid phase from the mud. Both the 10 ppb and 30 ppb concentrations of the date palm seed LCM showed effective sealing and blocking efficiency in the tested mud. As also shown in Table 7, the 10 ppb and 30 ppb concentrations of the date palm seed LCM had comparable performance to the walnut LCM in the NaCl-polymer mud.

A fourth plugging efficiency test was conducted on the date palm seed LCM and walnut LCM using a 2 mm slotted disc and the Permeability Plugging Tester apparatus at about 250° F. and about 1500 psi differential pressure. For the third plugging efficiency test, the date palm seed LCM and walnut LCM were incorporated into a 90 pcf $CaCl_2$-polymer mud. The 90 pcf $CaCl_2$-polymer mud includes PAC LV filtrate control additive manufactured by BRI-CHEM Supply Corporation of Denver, Colo., USA. The composition of the 90 pcf $CaCl_2$-polymer mud is shown in Table 8:

TABLE 8

Composition of 90 pcf $CaCl_2$-polymer

| Mud Component | Quantity |
|---|---|
| Water | 294.87 cc |
| Bentonite | 5.00 g |
| PAC LV | 3.00 g |
| XC polymer | 1.00 g |
| Cacl₂ | 126.37 g |
| Lime | 0.50 g |
| Barite | 74.60 g |

Table 9 shows the results of the plugging efficiency tests for the date palm seed LCM at 10 ppb and 30 ppb concentrations in the 90 pcf $CaCl_2$-polymer mud and the plugging efficiency tests for the walnut LCM at 10 ppb and 30 ppb concentrations in the 90 pcf $CaCl_2$-polymer mud:

TABLE 9

Plugging Efficiency Test Results for Date Palm Seed LCM and Walnut LCM in 90 pcf CaCl2-polymer mud

| Mud | LCM | Concentration | Spurt loss (cc) | Fluid loss (cc) | Total Leak off (cc) | Cake Thickness (mm) | PPT Value (cc) |
|---|---|---|---|---|---|---|---|
| 90 pcf $CaCl_2$-polymer mud | Date palm seed LCM | 10 ppb | 0 | 0.2 | 0.2 | N/A | 0.4 |
| 90 pcf $CaCl_2$-polymer mud | Walnut LCM | 10 ppb | 0.1 | 2.8 | 2.9 | N/A | 5.8 |
| 90 pcf $CaCl_2$-polymer mud | Date palm seed LCM | 30 ppb | 0 | 0 | 0 | N/A | 0 |
| 90 pcf $CaCl_2$-polymer mud | Walnut LCM | 30 ppb | 0 | 0 | 0 | N/A | 0 |

As shown in Table 9, both the 10 ppb and 30 ppb concentrations of the date palm seed LCM stopped the loss of the whole $CaCl_2$-polymer mud and the loss of the fluid phase from the 90 pcf $CaCl_2$-polymer mud. Both the 10 ppb and 30 ppb concentrations of the date palm seed LCM showed effective sealing and blocking efficiency in the tested 90 pcf $CaCl_2$-polymer mud. As also shown in Table 9, the 10 ppb and 30 ppb concentrations of the date palm seed LCM had comparable performance to the walnut LCM in the $CaCl_2$-polymer mud.

Thus, as shown in Tables 2-9, the date palm seed LCM may achieve no loss of whole mud and, in some concentrations, no losses of the fluid phase from the mud. The loss of the fluid phase from the mud may depend on the concentration of date palm seed LCM. At concentrations of 30 ppm or greater in the tested muds, the date palm seed LCM achieve no loss of whole mud and no losses of the fluid phase from the mud. At concentrations of 30 ppm or greater in the tested muds, the date palm seed LCM achieve no loss of whole mud and negligible loses of the fluid phase from the mud. In some embodiments, the concentration of date palm seed LCM may be increased to achieve no loss of whole mud and no losses of the fluid phase from the mud.

Date Palm Seed LCM Manufacture and Use

In some embodiments, a date palm seed LCM may be composed of date palm seed particles produced from date palm seeds. The date palm seeds may be produced as a waste by-product from date processing, and the date palm seeds may be obtained from date processing plants to provide sustainable source of material for the date palm seeds LCM. In some embodiments, the use of local sources of date palm seeds may reduce the cost of imported LCM products, components, or both. In some embodiments, the date palm seeds may be obtained from the species *Phoenix dactylifera*. It should be appreciated that, in some embodiments, the date palm seeds may be obtained from genetically modified date trees (that is, genetically modified organisms (GMOs)). In some embodiments, the date palm seeds may be prepared by cleaning the caps before use as an LCM, such as by blowing air over the seeds to remove dust, dirt, and other materials.

In some embodiments, the date palm seed LCM may include a date palm seed particle admixture having at least two sizes of particles. In some embodiments, the date palm seed LCM may include date palm seed particles having a size greater than about 2380 microns in a range of about 40% to about 42% by weight of the total weight, date palm seed particles having a size greater than about 595 microns and less than about 2380 microns in a range of about 46% to about 48% by weight of the total weight, date palm seed particles having a size greater than about 400 microns and less than about 595 microns in a range of about 4% to about 6% by weight of the total weight, date palm seed particles having a size less than about 210 microns and greater than about 148 microns in a range of about 4% to about 6% by weight of the total weight, and date palm seed particles having a size less than about 149 microns in a range of about 1% to about 3% by weight of the total weight. In some embodiments, the date palm seed LCM may include a date palm seed particle admixture having at least two or more groups of particles having the size ranges described supra: date palm seed particles having a size greater than about 2380 microns, date palm seed particles having a size greater than about 595 microns and less than about 2380 microns, date palm seed particles having a size greater than about 400 microns and less than about 595 microns, date palm seed particles having a size less than about 210 microns and greater than about 148 microns, and date palm seed particles having a size less than about 149 microns.

In some embodiments, the date palm seeds may include untreated date palm seeds, thus preserving the environmentally-friendly and biodegradable properties of the manufacturing process, the fibers, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date palm seeds may be manufactured without treating before, during, or after drying or any other processing.

In some embodiments, the date palm seed LCM may be added directly to a drilling fluid, such as a drilling mud, to create an altered drilling fluid having the date fruit cap LCM. For example, in some embodiments, the date palm seed LCM may be added to (for example, blended with) an oil-based drilling mud or a water-based drilling mud. In some embodiments, the date palm seed LCM may be added at the mud pit of a mud system. After addition of the date fruit cap LCM to a drilling fluid, the altered drilling fluid may be circulated at a pump rate effective to position the altered drilling fluid into contact with a lost circulation zone in a wellbore, such that the date fruit cap LCM alters the lost circulation zone (for example, by entering and blocking porous and permeable paths, cracks, and fractures in a formation in the lost circulation zone, such as forming a plug in a fracture).

As noted in the disclosure, the mechanical properties of the date palm seed LCM may prevent degradation of the date palm seed LCM while circulating downhole as a fluid loss additive or formation strengthening material. Moreover, the eco-friendly, non-toxic, and environmentally friendly properties of the date palm seed LCM may minimize or prevent any environmental impact, any effect on ecosystems, habitats, population, crops, and plants surrounding the drilling site where the date palm seed LCM is used.

FIG. 1 depicts a process 100 for producing and using a date palm seed LCM in accordance with an example embodiment of the disclosure. Initially, date palm seeds from the date palms of date trees may be collected (block 102). For example, as discussed supra, date palms seeds may be collected from waste produced from date palm processing, such as by obtaining the waste at date palm processing facilities.

The collected date palm seeds may be dried (block 104). In some embodiments, the date palm seeds may be dried using a sun drying process over a time period in atmospheric conditions. Next, the dried date palm seeds may be ground (block 106) using, for example a suitable grinder, such as an industrial grinder. In some embodiments, the date palm seeds may be crushed before being ground. For example, in such embodiments, the date palm seeds may be crushed to first size, and the crushed date palm seeds may be ground to a second size less than the first size.

Next, the date palm seed particles may be sifted using one or more sieves and size-graded after sifting (block 108). After sifting and size-grading, the suitable amounts of each size range of date palm seed particles may be collected and placed in a mixing apparatus (block 110), such as a mixing bowl. The date palm seed particles in the mixing bowl may be mixed at a low shear rate (block 112) to produce a date palm seed admixture for use as a date palm seed LCM. In some embodiments, the date palm seed admixture may be packed for transportation and use. For example, the date palm seeds may be packed in paper bags or other containers. In some embodiments, for example, a suitable amount of date palm seed admixture may be transported to an oil and gas operations site for use as an LCM. In some embodiments, the date palm seed admixture may be blended with other LCMs to manufacture a "one sack" LCM system. For example, the date palm seed admixture may be blended with a flake LCM, a fibrous LCM, or other LCMs, to manufacture a "one sack" LCM system.

In some embodiments, the date palm seed LCM may be added directly to a drilling fluid (block 114), such as a drilling mud, to create an altered drilling fluid having the LCM. For example, in some embodiments, the date palm seed LCM may be added to (for example, blended with) an oil-based drilling mud or a water-based drilling mud. In some embodiments, the date palm seed LCM may be added at the mud pit of a mud system. After addition of the date fruit cap LCM to a drilling fluid, the altered drilling fluid may be circulated at a pump rate effective to position the drilling fluid into contact with a lost circulation zone in a wellbore, such that the date fruit cap LCM alters the lost circulation zone (for example, by entering and blocking porous and permeable paths, cracks, and fractures in a formation in the lost circulation zone).

In some embodiments, the date palm seed LCM and one or more additional LCMs may be added to a drilling fluid (block 116), such as a drilling mud, to create an altered drilling fluid having the LCMs. For example, in some embodiments, the date palm seed LCM and one or more additional LCMs may be added to an oil-based drilling mud or a water-based drilling mud. In other embodiments, the date palm seed LCM may be added to a cement slurry for use in a cementing operation.

The biodegradation properties of the date palm seed LCM may enable the date palm seed LCM to easily degrade and disappear from the environment over time and minimize or prevent any environmental impact. Further, the non-toxic properties of the date palm seed LCM may minimize or prevent any effect on ecosystems, habitats, population, crops, and plants surrounding the drilling site where the date palm seed LCM is used.

In some embodiments, the date palm seed LCM may be mixed with a carrier fluid, a viscosifier, or both. In some embodiments, a date palm seed LCM homogenous suspension or pill may be formed. For example, a specific carrier fluid, viscosifier, or combination therefor may be selected to form a homogenous suspension or pill having the date palm seed LCM. In some embodiments, the carrier fluid may be water or an oil-based fluid. In some embodiments, the carrier fluid may be fresh water, sea water, salt water, diesel oil, mineral oil, or synthetic oil. In some embodiments, the viscosifier may be a clay or a polymer. Next, the homogenous suspension may be added to a drilling fluid and used in the manner similar to the date palm seed LCM described in the disclosure.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to control lost circulation in a lost circulation zone in a wellbore comprising:
   introducing an altered drilling fluid into the wellbore such that the altered drilling fluid contacts the lost circulation zone and reduces a rate of lost circulation into the lost circulation zone, where the altered drilling fluid comprises a drilling fluid and a lost circulation material (LCM), wherein the LCM consists of:
   a first plurality of untreated particles having a first particle size, wherein the first particle size comprises greater than 2380 microns, wherein the first plurality of particles comprises an amount in the range of 40 weight percentage of the total weight (w/w %) to 42 w/w %;
   a second plurality of the untreated particles having a second particle size, wherein the second particle size comprises greater than 595 microns and less than 2381 microns;
   a third plurality of the untreated particles having a third particle size, wherein the third particle size comprises greater than 400 microns and less than 596 microns;
   a fourth plurality of the untreated particles having a fourth particle size, wherein the fourth particle size comprises less than 210 microns and greater than 148 microns;
   a fifth plurality of the untreated particles having a fifth particle size, wherein the fifth particle size comprises less than 149 microns, wherein the untreated particles comprise ground date palm seeds,
   wherein the LCM has a concentration of at least 10 pounds-per-barrel in the altered drilling fluid and prevents the loss of whole mud in the lost circulation zone.

2. The method of claim 1, comprising adding the LCM to the drilling fluid to create the altered drilling fluid.

3. The method of claim 1, wherein the untreated particles consist of ground date palm seeds.

4. The method of claim 1, wherein the altered drilling fluid consists of the drilling fluid and the LCM.

5. The method of claim 1, wherein the reduced rate of lost circulation is less than an LCM formed from tree nuts.

6. The method of claim 5, wherein the LCM formed from tree nuts comprises an LCM formed from walnuts.

7. The method of claim 1, wherein the drilling fluid is selected from the group consisting of a bentonite mud, a KCl-polymer mud, a NaCl-polymer mud, and a CaCl$_2$-polymer mud.

* * * * *